United States Patent
Champaneria et al.

(10) Patent No.: US 9,773,209 B1
(45) Date of Patent: Sep. 26, 2017

(54) DETERMINING SUPERVISED TRAINING DATA INCLUDING FEATURES PERTAINING TO A CLASS/TYPE OF PHYSICAL LOCATION AND TIME LOCATION WAS VISITED

(71) Applicant: Google Inc., Mountain View, CA (US)

(72) Inventors: Amay Nitin Champaneria, San Francisco, CA (US); Frederick Peter Brewin, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 507 days.

(21) Appl. No.: 14/321,238

(22) Filed: Jul. 1, 2014

(51) Int. Cl.
    G06F 15/18 (2006.01)
    G06N 99/00 (2010.01)

(52) U.S. Cl.
    CPC .................. *G06N 99/005* (2013.01)

(58) Field of Classification Search
    CPC ................................. G06K 9/00624
    USPC ...................................... 706/15, 45
    See application file for complete search history.

(56) References Cited

U.S. PATENT DOCUMENTS

| | | | |
|---|---|---|---|
| 8,595,153 B2 | 11/2013 | Drucker et al. | |
| 9,160,690 B2* | 10/2015 | Bonforte | H04L 67/306 |
| 2006/0179017 A1 | 8/2006 | Forman et al. | |
| 2010/0306185 A1* | 12/2010 | Smith | G06Q 10/107 |
| | | | 707/709 |
| 2011/0191768 A1* | 8/2011 | Smith | G06F 9/445 |
| | | | 717/176 |
| 2011/0289025 A1 | 11/2011 | Yan et al. | |
| 2012/0215861 A1* | 8/2012 | Smith | H04L 51/12 |
| | | | 709/206 |
| 2015/0350116 A1* | 12/2015 | Bhagwan | H04L 51/00 |
| | | | 709/206 |

OTHER PUBLICATIONS

Bellotti et al., Activity-Based Serendipitous Recommendations with the Magitti Mobile Leisure Guide, 2008, ACM, pp. 1157-1166.*
Wallace, et al., "Intelligent One-Stop-Shop Travel Recommendations Using an Adaptive Neural Network and Clustering of History," Information Technology & Tourism, vol. 6, Cognizant Comm. Corp., 2004, 13 pages.
Hong, et al., "Context-Aware System for Proactive Personalized Service Based on Context History," May 2009, Expert Systems with Applications 36, Issue 4, pp. 7337-8712, Elsevier Ltd.
Hariharan, et aL, "Project Lachesis: Parsing and Modeling Location Histories," School of Information and Computer Science, University of California, Irvine, GlScience 2004, LNCS 3234, pp. 106-124.
Zheng, et al., "Collaborative Location and Activity Recommendations with GPS History Data," Hong Kong University of Science and Technology, Beijing, China, WWW 2010, Apr. 26-30, 2010, Raleigh, North Carolina, 10 pages.

* cited by examiner

*Primary Examiner* — David Vincent
(74) *Attorney, Agent, or Firm* — Middleton Reutlinger (57) ABSTRACT

Methods and apparatus are disclosed for determining supervised training data, such as travel-related supervised training data, for training a machine learning system. In some implementations, supervised training data may be determined that includes input features based on information items of users and desired output features based on one or more physical locations visited by users.

22 Claims, 4 Drawing Sheets

DETERMINING SUPERVISED TRAINING DATA INCLUDING FEATURES PERTAINING TO A CLASS/TYPE OF PHYSICAL LOCATION AND TIME LOCATION WAS VISITED

BACKGROUND

Automatic extraction of information from electronic documents of a user may help the user to be organized. For example, when a user receives an email from an airline with an itinerary, it may be helpful to the user if that itinerary is automatically extracted and corresponding entries are added to the user's calendar. When a format of such an email is known, the same technique may be used to extract certain items of the itinerary. However, formats of such emails may change over time and/or between airlines. Additionally, the user may receive "informal" emails, e.g., dictated by human beings rather than automatically, with less predictable formats that make determination of useful information from the emails more difficult. Also, the user may receive "formal" or "informal" emails that indicate information that may be of interest to a user, but that don't explicitly contain such information, thereby preventing extraction of the information directly from the e-mail. Additionally, other information items associated with a user may contain or indicate information that may be of interest to a user, but determining that information, and/or determining that the other information items truly indicate the information is of interest to the user, may be more difficult than extracting an itinerary from an email with a known format.

SUMMARY

This specification is directed generally to methods and apparatus for determining supervised training data, such as travel-related supervised training data, for training a machine learning system. The output of a machine learning system trained based on supervised training data described herein may be utilized to tailor information that is provided to a user. For example, travel-related training data described herein may enable training of a machine learning system that may receive, as input, features related to one or more information items of a user (e.g., features related to e-mails sent/received; text messages sent/received; social networking posts, tweets, messages; submitted searches; created calendar entries; location data; and/or browsing history), and provide, as output, one or more features related to one or more physical locations that may be of interest to the user. The output may be utilized, for example, to determine suggestions related to the one or more physical locations and the suggestions may be provided for presentation to the user via a computing device of the user.

In some implementations, supervised training data may be determined that includes input features based on information items of users and desired output features based on one or more physical locations visited by users. For example, a training example of the training data may include input features determined based on a set of one or more information items of a user such as e-mails, searches, calendar entries, browsing history, and/or location data of the user. The training example may further include one or more desired output features based on one or more physical locations visited by the user. Various techniques, such as those described herein, may be utilized to determine which information items to include in a set of information items on which input features of a training example are based and/or to determine the one or more physical locations on which output features of the training example are based. For example, in some implementations the set of information items and the one or more physical locations on which a training example are based may be determined based on one or more determined associations between the information items of the set and the one or more physical locations. Which technique(s) are employed may be dependent on, for example, the desired functionality of the machine learning system (e.g., what the desired input/output parameters are), costs/benefit considerations in training the machine learning system, design preference, and so forth.

In some implementations, a computer implemented method may be provided that includes the steps of: determining input features of a training example based on a set of one or more information items associated with a user, the information items each indicative of one or more activities of the user and including one or more non-location data based information items; determining a visit by the user to one or more physical locations; determining one or more desired output features of the training example based on the one or more physical locations; and providing the training example to a machine learning system for training of the machine learning system based on the training example.

This method and other implementations of technology disclosed herein may each optionally include one or more of the following features.

In some implementations, determining the visit by the user to the one or more physical locations includes determining the visit based on one or more signals from a computing device associated with the user. In some of those implementations, the one or more signals from the computing device include location data associated with the one or more physical locations. In some of those implementations, the one or more signals from the computing device include location data associated with the one or more physical locations and associated with at least a threshold duration of visit to the one or more physical locations. In some of those implementations, the one or more signals from the computing device include location data associated with the one or more physical locations and determining the visit by the user to the one or more physical locations includes: determining the visit is associated with travel of the user based on comparing the location data to one or more other indications of location associated with the user. In some of those implementations, the one or more signals from the computing device include explicit user input via the computing device, the explicit user input indicating the user visited the one or more physical locations.

In some implementations, the method further includes determining the set of the information items based on determining, for each of the information items of the set, one or more associations of the information item to the one or more physical locations. In some of those implementations, the one or more associations of a given information item of the information items of the set to the one or more physical locations includes at least one of: temporal proximity of the given information item to the one or more physical locations, one or more entities associated with both the given information item and the one or more physical locations, and one or more terms included in the given information item and associated with the one or more physical locations. In some of those implementations, a given information item of the information items of the set is indicative of a document interacted with by the user, and determining the one or more associations of the given information item to the one or more physical locations includes analyzing the document to determine the one or more associations of the document to the physical location. In some of those implementations, determining the one or more associations of the given information item to the one or more physical locations includes: providing a query to a computing device of the user based on determining the one or more associations of the document to the physical location, the query seeking confirmation the user visited the one or more physical locations; receiving affirmative input responsive to the query; and determining the one or more associations of the given information item of the information items to the one or more physical locations based on receiving the affirmative input. In some of those implementations, analyzing the document includes applying one or more rules to determine the one or more associations of the document to the physical location. In some of those implementations, analyzing the document includes using the machine learning system to determine the one or more associations of the document to the physical location.

In some implementations, the one or more physical locations is a geographic area encompassing a plurality of individual points of interest.

In some implementations, the one or more physical locations is an individual point of interest. In some of those implementations, the output features include one or more class labels associated with the individual point of interest, each of the class labels associated with the point of interest and additional points of interest.

In some implementations, the information items of the set include a first information item from a first source and a second information item from a second source.

In some implementations, the method further includes: determining additional input features of an additional set of one or more additional information items associated with an additional user; providing the additional input features to the machine learning system; receiving, as output from the machine learning system, one or more responsive output features; and determining one or more suggestions related to one or more responsive physical locations based on the responsive output features. In some of those implementations, the method further includes providing the one or more suggestions to a computing device of the additional user. In some of those implementations, the providing the one or more suggestions to the computing device of the additional user is unrelated to providing results in response to a search query submission by the user.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
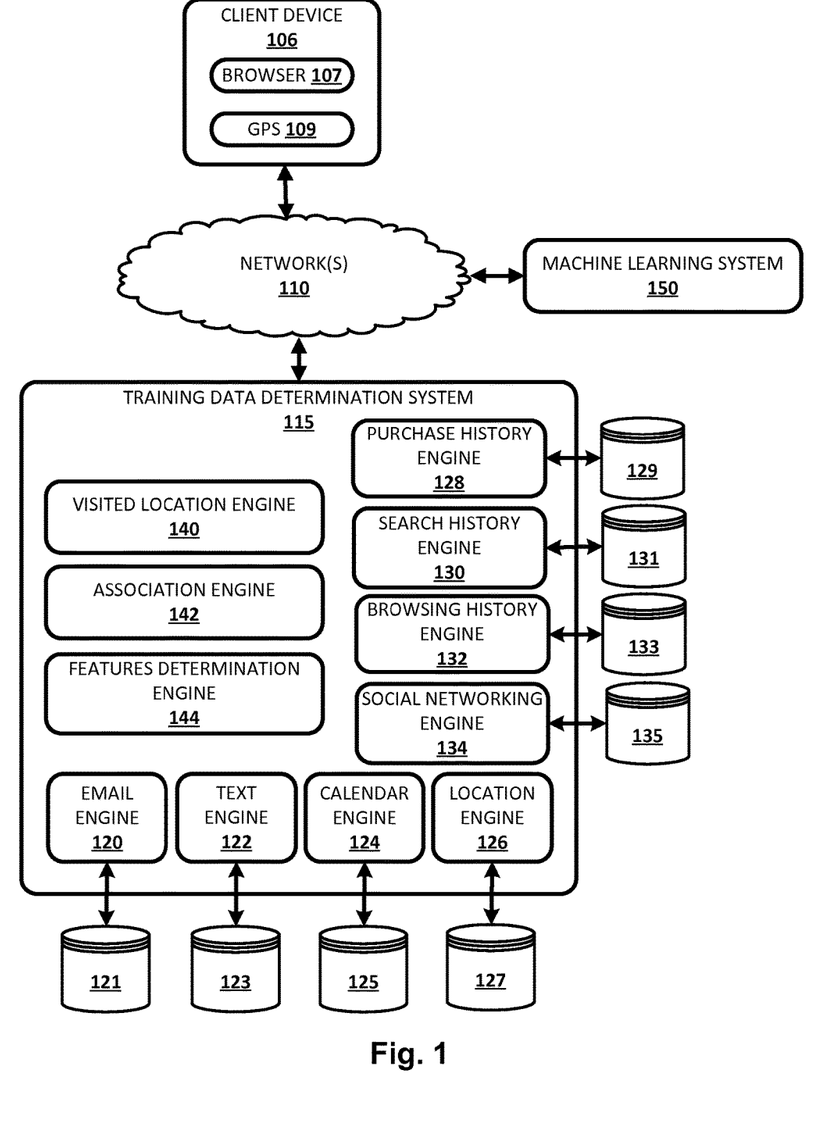
FIG. 1 illustrates an example environment in which training data for training a machine learning system may be determined, and in which the machine learning system may be trained based on the training data.

FIG. 1 illustrates an example environment in which training data for training a machine learning system may be determined, and in which the machine learning system may be trained based on the training data. The example environment includes a client device 106, a training data determination system 115, and a machine learning system 150. Training data determination system 115 may be implemented in one or more computers that communicate, for example, through a network (not depicted). Training data determination system 115 is an example of a system in which the systems, components, and techniques described herein may be implemented and/or with which systems, components, and techniques described herein may interface.

Client device 106 may be a computer coupled to the training data determination system 115, the machine learning system 150, and/or other component (e.g., a suggestion system in communication with the machine learning system 150) through one or more networks 110 such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided.

As described herein, the training data determination system 115 may utilize information items that are indicative of activities of users in determining supervised training data for training a machine learning system. One or more of the information items may be indicative of activities of users via computing devices such as client device 106. For the sake of brevity, only a single client device 106 is illustrated in FIG. 1 and described in some examples herein. However, activities of multiple users via multiple client devices may be utilized in determining supervised training data. Moreover, although a user will likely operate a plurality of computing devices, and a training example may be determined based on user actions via multiple of the computing devices, for the sake of brevity, certain examples described in this disclosure will focus on the user operating client device 106.

Client device 106 may operate one or more applications and/or components such as those that facilitate user consumption and manipulation of certain information items, those that provide information items to training data determination system 115 and/or other component(s), and/or those that facilitate provision of suggestions or other information determined based on output of machine learning system 150. These applications and/or components may include, but are not limited to, a browser 107 and a position coordinate component, such as a global positioning system ("GPS") component 109, and so forth. In some instances, one or more of these applications and/or components may be operated on multiple client devices operated by the user. Other components of client device 106 not depicted in FIG. 1 that may provide information items of the user include, but are not limited to, a calendar application, a phone application, a user contacts application, a social networking application, an email application, a task application, a virtual wallet application, cameras, light sensors, presence sensors, thermometers, health sensors (e.g., heart rate monitor, glucose meter, blood pressure reader), accelerometers, gyroscopes, and so forth.

As used herein, information items of a user may include, for example, one or more of: communications sent or received by the user, such as emails, text messages, social networking communications (e.g., posts, tweets, private messages); searches of the user submitted to one or more search engines; calendar entries of the user; task entries of the user; location data of the user; extracted reservation information (e.g., extracted from an e-mail or calendar entry of the user); spreadsheets of the user (e.g., that the user uses to organize a schedule); browsing history of the user (e.g., indicating one or more documents accessed by the user such as webpages, videos, and/or images); application purchase history of the user; app usage and/or install history; and so forth.

Client device 106, training data determination system 115, and machine learning system 150 each include one or more memories for storage of data and software applications, one or more processors for accessing data and executing applications, and other components that facilitate communication over a network. The operations performed by client device 106, training data determination system 115, and/or machine learning system 150 may be distributed across multiple computer systems.

In various implementations, training data determination system 115 may include an email engine 120, a text messaging engine 122, a calendar engine 124, a location engine 126, a purchase history engine 128, a search history engine 130, a browsing history engine 132, and/or a social networking engine 134. Generally, each of the engines 120, 122, 124, 126, 128, 130, 132, and/or 134 may determine and/or maintain certain information items of users that may be utilized to determine supervised training data as described herein. In some implementations, one or more of engines 120, 122, 124, 126, 128, 130, 132, and/or 134 may be omitted. For example, in some implementations training data determination system 115 may have access to one or more indices that each includes information items such as those described herein, and one or more of the engines 120, 122, 124, 126, 128, 130, 132, and/or 134 may be omitted. In some implementations, all or aspects of one or more of engines 120, 122, 124, 126, 128, 130, 132, and/or 134 may be combined. In some implementations, one or more of engines 120, 122, 124, 126, 128, 130, 132, and/or 134 may be implemented in a component that is separate from training data determination system 115. For example, in some implementations, one or more of engines 120, 122, 124, 126, 128, 130, 132, and/or 134, or any operative portion thereof, may be implemented in a component that is executed by client device 106.

Email engine 120 may maintain an index 121 of email correspondence between various users that may be available, in whole or in selective part, to various components of training data determination system 115. For instance, email engine 120 may include an email server, such as a simple mail transfer protocol ("SMTP") server that operates to permit users to exchange email messages. In various implementations, email engine 120 may maintain, e.g., in index 121, one or more user mailboxes in which email correspondence is stored. Similar to email engine 120, text messaging engine 122 may maintain another index 123 that includes or facilitates access to one or more text messages exchanged between two or more users. While depicted as part of training data determination system 115 in FIG. 1, in various implementations, all or part of email engine 120, index 121 (e.g., one or more user mailboxes), text messaging engine 122 and/or index 123 may be omitted and/or implemented elsewhere, e.g., on an email service system, text messaging service system, and/or client device 106.

Calendar engine 124 may be configured to maintain an index 125 of calendar entries and/or other scheduling-related information pertaining to one or more users. Location engine 126 may be configured to maintain an index 127 of location data of one or more users. For example, location data based on GPS component 109 and/or other position coordinate component of client device 106 may be provided to location engine 126 and location engine 126 may maintain the location data of a user of the client device 106 in index 127. Purchase history engine 128 may maintain an index 129 of one or more purchase histories associated with one or more users. Index 129 may include evidence of purchase history in various forms, including but not limited to a list of purchases made with one or more credit cards or electronic wallets, a corpus of financial statements (e.g., bank statements, credit card statements), receipts, invoices, and so forth. Search history engine 130 may maintain an index 131 of one or more search histories associated with one or more users. Browsing history engine 132 may maintain an index 133 of one or more browsing histories associated with one or more users. For example, a user's browsing activities via browser 107 of client device 106 may be maintained by browsing history engine 132 in index 133. Social networking engine 134 may maintain an index 135 of one or more social networking posts, messages, tweets, contacts, and/or other social networking information associated with one or more users. While depicted as part of training data determination system 115 in FIG. 1, in various implementations, all or part of calendar engine 124, location engine 126, purchase history engine 128, search history engine 128, browsing history engine 132, and/or social networking engine 134, and/or their respective indices 125, 127, 129, 131, 133, and/or 135 may be omitted and/or implemented elsewhere, e.g., on client device 106 and/or other computing devices.

In this specification, the term "index" will be used broadly to refer to any collection of data. The data of the index does not need to be structured in any particular way and it can be stored on storage devices in one or more geographic locations. Thus, for example, the indices 121, 123, 125, 127, 129, 131, 133, and/or 135 may include multiple collections of data, each of which may be organized and accessed differently.

Training data determination system 115 determines supervised training data that includes input features based on information items of users and desired output features based on one or more physical locations visited by users. For example, the training data determination system 115 may determine a training example of the training data that includes input features determined based on a set of one or more information items of a user (e.g., based on informations items obtained from or identified based on one or more of the indices 121, 123, 125, 127, 129, 131, 133, and/or 135) and desired output features based on one or more physical locations determined to have been visited by the user (e.g., based on informations items obtained from or identified based on one or more of the indices 121, 123, 125, 127, 129, 131, 133, and/or 135). Various techniques, such as those described herein, may be utilized to determine which information items to include in a set of information items on which the training example is based and/or to determine the one or more physical locations on which the training example is based.

Training data determination system 115 also includes a visited location engine 140, an association engine 142, and a features determination engine 144 that are utilized to determine supervised training data. Generally, the visited location engine 140 determines one or more physical locations that have been visited by users. Generally, the association engine 142 determines, for each of a plurality of training examples of supervised training data, a set of information items on which input features of the training example will be based and a set of one or more visited physical locations (as determined by visited location engine 140) on which output features of the training example will be based. Generally, the features determination engine 144 determines, for each of a plurality of training examples of supervised training data, input and output features of the training example based on the output of the association engine 142. For example, the features determination engine 144 determines input features of the training example based on a set of information items determined by association engine 142 and output features of the training example based on one or more physical locations associated with the set of information items, as determined by association engine 142.

In some implementations, the visited location engine 140 may determine a physical location visited by a user based on index 127 of location data. For example, the visited location engine 140 may determine a physical location visited by the user based on location data associated with the user indicating a visit of at least a threshold duration to the physical location. The visited location engine 140 may determine the physical location at various levels of granularity. For example, in some implementations the determined physical location may be a geographic area such as a neighborhood, a street, a zip code, a city, a region, a state, a country, and so forth. Also, for example, in some implementations the determined physical location may be a particular point of interest such as a particular restaurant, a particular store, a particular shopping center, a particular park, a particular museum, and so forth.

In some implementations, the visited location engine 140 may determine a physical location visited by a user based on explicit input provided by the user that indicates the user visited the physical location. For example, the user may provide explicit input via client device 106 that indicates the user visited the physical location such as entering information related to the physical location in a travel log. Also, for example, in some implementations the machine learning system 150 and/or another component may determine a physical location was potentially visited by the user, and provide a query to the client device 106 of the user that seeks confirmation the user visited the physical location. If affirmative input is received in response to the query, the visited location engine 140 may determine the physical location was visited by the user. As one example, location data of the user may not be accurate enough to define a particular point of interest with sufficient confidence, and may instead identify multiple points of interest. In some of those implementations, the visited location engine 140 may provide a query to the client device 106 of the user that is tailored to determine which of the points of interest was visited by the user. As another example, a document or other information item of a user may indicate a physical location that may be visited by a user, and one or more engines of training data determination system 115 may provide a query to the client device 106 to confirm that the user has visited, or will visit, the physical location.

In some implementations, the visited location engine 140 may determine only physical locations visited by the user that are "travel-related". For example, the visited location engine 140 may determine only physical locations visited by the user that are "travel-related" when determining supervised training data that is focused on training a machine learning system to provide output related to one or more travel-related physical locations that may be of interest to a user. In some implementations of determining only travel-related physical locations, the visited location engine 140 may determine only physical locations visited by the user that are associated with an area that is not the user's "home area" or an area that is otherwise frequented by the user. For example, the visited location engine 140 may determine only physical locations for the user that represent an outlier of location data for the user. Also, for example, the visited location engine 140 may determine only physical locations for the user that are a threshold distance away from a home area associated with the user and/or a work area associated with the user. As one example, suppose a user resides in San Francisco and takes a vacation to Chicago for the weekend. The visited location engine 140 may determine one or more physical locations in Chicago (e.g., "Chicago" generally and/or one or more points of interest visited) based on determining that those physical locations are "travel-related" for the user.

As described above, the association engine 142 determines, for each of a plurality of training examples of supervised training data, a set of information items on which input features of the training example will be based and a set of one or more visited physical locations (as determined by visited location engine 140) on which output features of the training example will be based. For example, the association engine 142 may determine a physical location visited by a user, as determined by visited location engine 140, and determine a set of information items that are associated with the physical location. Information items for inclusion in the set may be obtained from, or identified based on, one or more of the indices 121, 123, 125, 127, 129, 131, 133, and/or 135. In some implementations, the information items of the set include information items from a plurality of distinct sources and/or associated with a plurality of distinct types of user activity (e.g., emailing, browsing, purchasing, texting). For example, the information items of the set may include location data from index 127, emails from index 121, and browsing history from index 133. In some implementations, the information items of the set may include one or more non-location data based information items. In other words, the information items of the set may include one or more information items that are more than just location data of the user.

In some implementations, the association engine 142 may determine a set of information items associated with a visited physical location based on one or more associations between the information items of the set and the visited physical location. In some of those implementations, an association of a given information item of the information items of the set to the visited physical location may be based on one or more of: temporal proximity of the given information item to the physical location (e.g., the given information item is associated with a date or time that is within a threshold date or time of the visit to the physical location), one or more entities associated with both the given information item and the physical location (e.g., both associated with the same city, both associated with a "Restaurant" entity, both associated with a "Shopping" entity), and/or one or more terms included in the given information item and associated with the one or more physical locations (e.g., the physical location is "Chicago" and the information item includes "Chicago" or "Windy City").

As one example of temporal proximity, the given information item may be associated with a date and time at which the information item was created and the visited physical location may be associated with a date and time at which the physical location was visited. The given information item may be determined to be associated with the visited physical location based at least in part on the date and/or times associated with each being within a threshold of one another (e.g., within an hour of each other, within the same day, same week, same month). As one example of one or more entities associated with both the given information item and the physical location, the physical location may be the city of Chicago and associated with an entity identifying the city of Chicago—and the given information item may have at least a threshold strength of association with an entity identifying the city of Chicago. For example, the given information item may be a webpage about the city of Chicago identified from index 133 or a search query of "Chicago tourist attractions" identified from index 131. As another example of one or more entities associated with both the given information item and the physical location, the physical location may be a steak house in the city of Chicago and associated with entities identifying the city of Chicago, restaurants, and steak houses—and the given information item may have at least a threshold strength of association with one or more of those same entities. In some implementations an association of an information to an entity may be identified from one or more databases such as a database that maps webpages to entities, search queries to entities, and/or other information items to entities. As one example of one or more terms included in the given information item and associated with the one or more physical locations, the physical location may be the city of Chicago and associated with the term "Chicago"—and the given information item may be an e-mail, a text message, or a calendar entry including the term "Chicago".

In some implementations, an association of a given information item of the information items of the set to the visited physical location may be based on analyzing the given information item utilizing rules-based techniques and/or other techniques to determine the given information item is associated with the physical location. In some implementations the partially trained machine learning system 150 may be analyze the given information item to determine the information item is associated with the physical location. As one example, a given information item may be a document (e.g., an email), and determining the one or more associations of the given information item of the information items to the one or more physical locations may include analyzing the document to determine the one or more associations of the document to the physical location. In some implementations, determining the one or more associations of the given information item of the information items to the one or more physical locations includes: providing a query to a computing device of the user based on determining the one or more associations of the document to the physical location, the query seeking confirmation the user visited the one or more physical locations; receiving affirmative input responsive to the query; and determining the one or more associations of the given information item of the information items to the one or more physical locations based on receiving the affirmative input.

Additional description is provided herein regarding techniques the association engine 142 may utilize to determine a set of information items associated with a visited physical location based on one or more associations between the information items of the set and the visited physical location. Which technique(s) are employed may be dependent on, for example, the desired functionality of the machine learning system 150 (e.g., what the desired input/output parameters are), costs/benefit considerations in training the machine learning system, design preference, and so forth As described above, the features determination engine 144 determines, for each of a plurality of training examples of supervised training data, input and output features of the training example based on the output of the association engine 142. For example, the features determination engine 144 determines input features of the training example based on a set of one or more information items determined by association engine 142 and output features of the training example based on one or more physical locations associated with the set of information items, as determined by association engine 142. In some implementations, the input features of a training example include at least one feature for each information item of the set of information items. Features of an information item may include, for example, one or more of: a unique identifier of the information item, terms of the information item, metadata of the information item, time(s) associated with the information item, date(s) associated with the information item, entities associated with the information item, an author of the information item (e.g., a sender of an e-mail/text, an author of a webpage), a domain name associated with the information item (e.g., a domain name of URL for a webpage, a domain name associated with a sender of an e-mail), and/or data extracted from the information item. In some implementations, the output features of a training example include at least one feature for each physical location determined to be associated with the set of information items (e.g., by association engine 142). Features of a physical location may include, for example, a unique identifier of the physical location (e.g., an entity identifier particularly identifying the physical location), one or more class labels of the physical location (e.g., a "restaurant", "a fine dining restaurant", "a seafood restaurant"), time(s) associated with the visit to the physical location, and/or date(s) associated with the visit to the physical location.

The training examples determined by features determination engine 144 are provided as supervised training data to the machine learning system 150. The machine learning system 150 is trained based on the supervised training data. The machine learning system 150 analyzes the supervised training data to produce an inferred function, which can be used for analyzing new examples. The machine learning system 150 may utilize various techniques to produce an inferred function based on supervised training data such as decision tree learning, association rule learning, artificial neural network learning, inductive logic programming, clustering, and/or Bayesian networks.

In some implementations, the training data may be determined and the machine learning system 150 configured such that the trained machine learning system 150 receives, as input, features related to one or more information items associated with a user and provides, as output, one or more features related to one or more physical locations. The features may identify one or more particular locations such as "Chicago", "Neighborhood X", "Restaurant X", "Store X", "Shopping Area X" and/or may identify characteristics of locations such as class labels (e.g., "Large City", "Midwestern City", "Tourist Attraction", "Seafood Restaurant", "Expensive Restaurant", "Boutique Shop"). The features related to the one or more physical locations may be utilized, for example, by a suggestion system in communication with the machine learning system 150 to determine one or more suggestions to provide to the user via client device 106 that are related to the one or more physical locations. In some implementations, the suggestion system may provide the one or more suggestions to the user unrelated to providing results in response to a search query submission by the user. For example, the suggestion system may be a personal assistant application that may "surface" the suggestions to the user without prompting by the user and/or in response to a non-search query related action of the user such as accessing the personal assistant application.

As one example, features of information items related to a user's planned or current trip may be provided as input to the trained machine learning system 150 and the trained machine learning system 150 may provide, as output, features related to one or more physical locations. The output features may be utilized to determine one or more suggestions to provide to the user either prospectively (e.g., when the user is planning a trip) or in real-time (e.g., when actually on a trip). For example, features related to e-mails, searches, and browsing history of the user may be provided to the trained machine learning system 150 and the trained machine learning system 150 may provide as output one or more features that indicate the city of Chicago (e.g., the information items related to planning a trip to Chicago) and suggestions for the user may be tailored to the city of Chicago. As another example, the machine learning system may be trained such that the machine learning system can provide as output features related to one or more physical locations the user should visit next on a trip (e.g., based on input features related to the user's location, past locations visited, reservation details, the time, other users with the user, etc.). For example, the machine learning system can provide, as output, features that identify a particular point of interest or a plurality of points of interest (e.g., the output features may identify "Restaurants A, B, C" or "Highly Rated Chicago Restaurants that are in Neighborhood X") and one or more suggestions may be tailored based on the point(s) of interest.

Figure 2:
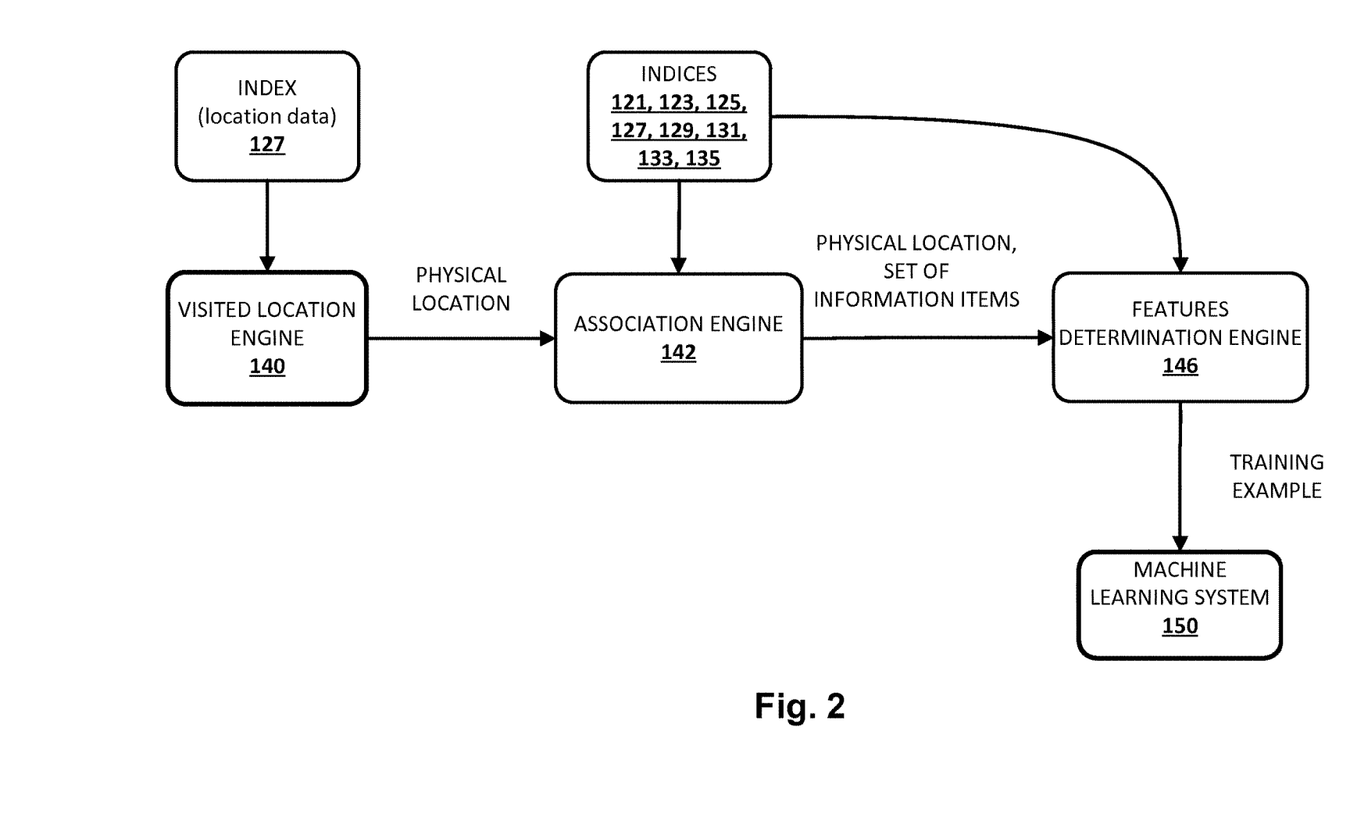
FIG. 2 illustrates an example of how a training example of training data may be determined.

FIG. 2 schematically depicts one example of how a training example of training data may be determined based on the present disclosure. Visited location engine 140 determines a physical location visited by a user based on index 127 of location data. As described herein, in some implementations the determined physical location may be a "travel-related" physical location. For example, the user may reside in San Francisco and the location of "Chicago" may be determined by the visited location engine 140 based on location data of the user. The determined physical location is provided to association engine 142. Association engine 142 utilizes one or more of indices 121, 123, 125, 127, 129, 131, 133, and 135 to determine a set of information items of the user that have one or more associations with the physical location determined by visited location engine 140. Continuing with the example, the location of Chicago may be determined by the visited location engine 140 and the association engine 142 may determine information items that are associated with an entity associated with the city of Chicago, that include text associated with the city of Chicago (e.g., "Chicago", "Windy City", "Chi-Town"), and/or that are associated with a date/time that is within a threshold date/time associated with the visit to Chicago. For example, the information items may include search queries of the user for "Chicago", "Chicago hotels", and "Chicago restaurants"; Websites A, B, and C that contain the term "Chicago" or are otherwise associated with Chicago; and/or purchases of the user that occur during, or within a threshold time of, the visit to Chicago.

The physical location and associated set of information items are provided to the features determination engine 144. The features determination engine 144 determines input features of a training example based on the provided set of information items determined by association engine 142. For example, the input features related to the search queries of "Chicago", "Chicago hotels", and "Chicago restaurants" may include time/dates of submission of the queries, terms of the queries, class labels of one or more terms of the queries (e.g., a class label of "City" for "Chicago"), and so forth. The features determination engine 144 determines output features of the training example based on the provided physical location. For example, the output features related to the physical location of Chicago may include time(s)/date(s) of the visit and a class label for Chicago such as "City". The training example is provided to machine learning system 150 and the machine learning system 150 is trained based on the training example. Providing supervised training data that includes training examples such as that described with respect to the preceding "Chicago" example may enable, for example, machine learning system 150 to receive, as input, one or more information items of a user and provide, as output, features that indicate a likelihood the user is going to travel to a city and that indicate likely time(s)/date(s) of the visit.

As another example of a training example that may be determined, a location of "Restaurant A" in the city of Chicago may be determined by the visited location engine 140 based on location data of a user. The determined physical location may be provided to association engine 142. Association engine 142 utilizes one or more of indices 121, 123, 125, 127, 129, 131, 133, and 135 to determine a set of information items of the user that have one or more associations with the physical location determined by visited location engine 140. Continuing with the example, the location of "Restaurant A" may be determined by the visited location engine 140 and the association engine 142 may determine information items that are associated with an entity associated with "Restaurant A" (e.g., an entity associated with the city of Chicago, an entity associated with the class of locations of restaurant), that include text associated with "Restaurant A" (e.g., text such as "Restaurant", "Chicago", "Windy City", "Chi-Town"), and/or that are associated with a date/time that is within a threshold date/time associated with the visit to "Restaurant A". For example, the information items may include search queries of the user for "best restaurants in Chicago" and "Chicago steakhouses"; a hotel of the user (e.g., an extracted information item based on location data and/or an e-mail confirmation) during the visit to "Restaurant A"; and/or other locations visited before the visit to "Restaurant A" (e.g., as indicated by location data). The features determination engine 144 determines input features of a training example based on the provided set of information items determined by association engine 142. For example, the input features related to the hotel the user stayed in may include time/dates of the stay, a "star" rating of the hotel, and/or other indication of the quality of the hotel. The features determination engine 144 determines output features of the training example based on the provided physical location. For example, the output features related to the physical location of "Restaurant A" may include one or more class labels for the restaurant such as "Fine Dining Restaurant", "Steakhouse", and/or "Expensive Restaurant". The training example is provided to machine learning system 150 and the machine learning system 150 is trained based on the training example. Providing supervised training data that includes training examples such as that described with respect to the preceding "Restaurant A" example may enable, for example, machine learning system 150 to receive, as input, one or more information items of a user and provide, as output, features that indicate class label(s) of restaurants or other points of interest that may be of interest to the user.

Training examples described herein are described with respect to a single user. However, it is understood that training data will include training examples based on information items of a plurality of users. For example, a first training example of training data may be based on information items of a first user, a second training example of the training data based on information items of a second user, and so forth. Moreover, although particular examples of training examples are provided herein, supervised training data that includes alternatively defined training examples may be utilized. Moreover, multiple sets of supervised training data may be determined based on the present disclosure, and each set may be utilized to train a unique machine learning system. Generally, training examples of supervised training data may be defined to achieve desired output from a machine learning system 150. For example, in some implementations it may be desirable to determine a set of information items on which input features are determined that are restricted to one or more sources, restricted to certain time(s)/date(s) relative to associated physical locations, etc. Also, for example, in some implementations it may be desirable to determine input features and/or output features with high levels of granularity, whereas in other implementations it may be desirable to determine input features and/or output features with low levels of granularity.

Figure 3:
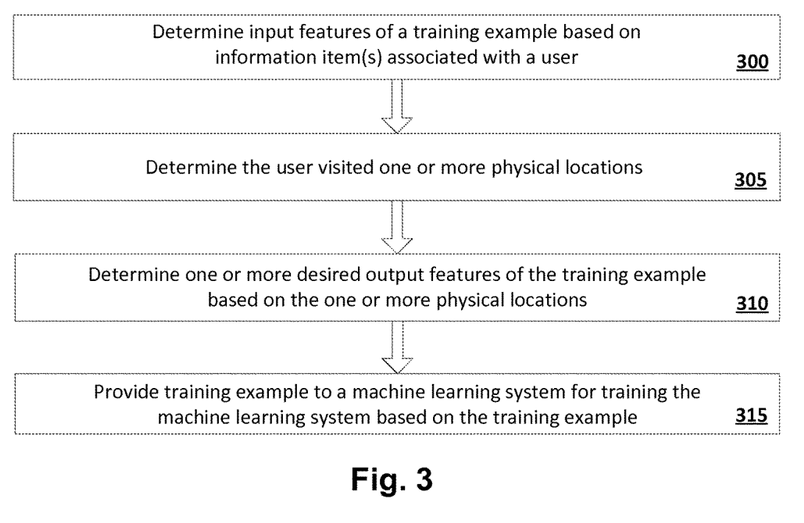
FIG. 3 is a flow chart illustrating an example method of determining a training example of training data for training of a machine learning system.

FIG. 3 schematically depicts an example method of determining a training example of training data for training of a machine learning system. For convenience, the operations of the flow chart are described with reference to a system that performs the operations. This system may include various components of various computer systems. For instance, some operations may be performed by one or more components of the training data determination system 115 such as visited location engine 140, association engine 142, and features determination engine 144. Moreover, while operations of the method of FIG. 3 are shown in a particular order, this is not meant to be limiting. One or more operations may be reordered, omitted or added.

At step 300, the system determines input features of a training example based on information items associated with a user. For example, features determination engine 144 may determine input features of the training example based on a set of information items obtained from, or identified based on, one or more of the indices 121, 123, 125, 127, 129, 131, 133, and/or 135. Features of an information item may include, for example, one or more of: a unique identifier of the information item, terms of the information item, metadata of the information item, time(s) associated with the information item, date(s) associated with the information item, entities associated with the information item, an author of the information item, a domain name associated with the information item, and/or data extracted from the information item.

In some implementations, the information items of the set on which the input features are determined include information items from a plurality of distinct sources and/or associated with a plurality of distinct types of user activity. In some implementations, the information items of the set may include one or more non-location data based information items. In some implementations, the information items of the set are determined based on one or more associations between the information items of the set and a visited physical location (as determined at step 305). For example, the association engine 142 may determine a set of information items associated with a visited physical location based on one or more associations between the information items of the set and the visited physical location. In some of those implementations, an association of a given information item of the information items of the set to the visited physical location may be based on one or more of: temporal proximity of the given information item to the physical location, one or more entities associated with both the given information item and the physical location, and/or one or more terms included in the given information item and associated with the one or more physical locations.

At step 305, it is determined the user visited one or more physical locations. For example, visited location engine 140 may determine one or more physical locations that have been visited by the user. In some implementations, the visited location engine 140 may determine a physical location visited by a user based on location associated with the user. In some implementations, the visited location engine 140 may determine a physical location visited by a user based on explicit input provided by the user that indicates the user visited the physical location. In some of those implementations, the explicit input may be in response to a query provided to the user that is tailored to determine and/or confirm a visit of the user to the physical location. In some implementations, the visited location engine 140 may determine only physical locations visited by the user that are "travel-related".

At step 310, one or more desired output features of the training example are determined based on the one or more physical locations. For example, features determination engine 144 may determine the one or more desired output features. Features of a physical location may include, for example, a unique identifier of the physical location, one or more class labels of the physical location, time(s) associated with the visit to the physical location, and/or date(s) associated with the visit to the physical location.

At step 315, the training example is provided to a machine learning system for training the machine learning system based on the training example. For example, the training data determination system 115 may provide the training example and additional training examples (e.g., including additional training examples determined based on the method of FIG. 3) as supervised training data to the machine learning system 150. The machine learning system 150 is trained based on the supervised training data. The machine learning system 150 analyzes the supervised training data to produce an inferred function, which can be used for analyzing new examples.

Figure 4:
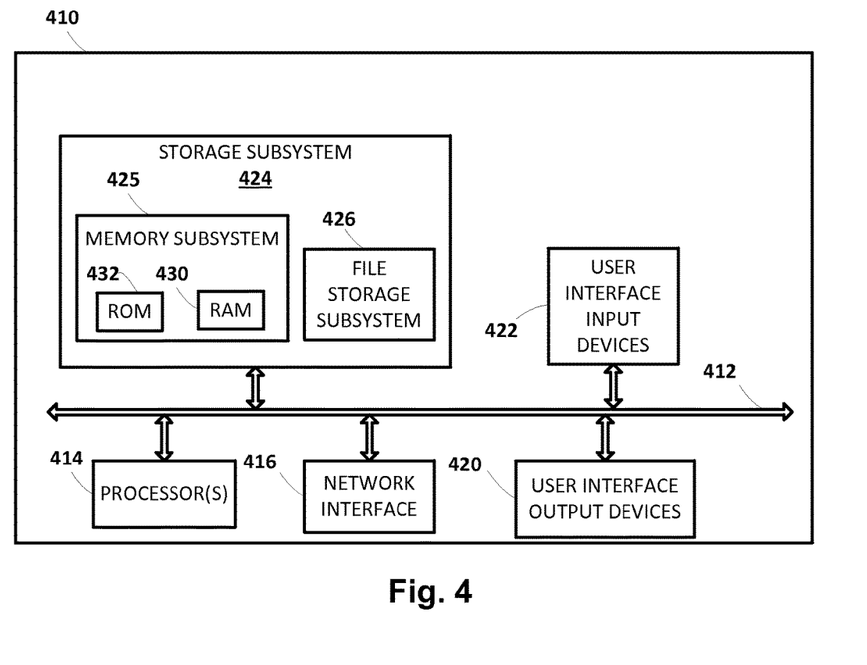
FIG. 4 illustrates an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of the method of FIG. 3, as well as one or more of the operations performed by visited location engine 140, association engine 142, features determination engine 144, and so forth.

These software modules are generally executed by processor 414 alone or in combination with other processors. Memory 425 used in the storage subsystem can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   determining that a user has visited a physical location,
   based on determining that the user has visited the physical location, determining output features of a training example based on the physical location, the output features including a class label stored in association with the physical location, and a time associated with the visit to the physical location;
   determining a set of information items associated with the user for use in determining input features of the training example, wherein determining the set of the information items is based on determining, for each of the information items of the set, one or more associations of the information item to the physical location,
      wherein the information items are each indicative of one or more activities of the user via one or more computing devices of the user,
      wherein the information items include one or more non-location data based information items, and
      wherein determining the one or more associations of a non-location data based information item, of the non-location data based information items, to the physical location comprises:
  determining a creation time or date of the non-location data based information item is within a temporal threshold of the visit of the user to the physical location, and
  determining the non-location data based information item includes a term describing the physical location;
determining the input features of the training example based on the set of the information items associated with the user, the input features including an additional term of the non-location data based information item, the additional term being in addition to the term describing the physical location; and
providing the training example to a machine learning system for training of the machine learning system based on the training example.

2. The method of claim 1, wherein determining the user has visited the physical location is based on one or more signals from a computing device associated with the user.

3. The method of claim 2, wherein the one or more signals from the computing device include location data associated with the physical location.

4. The method of claim 2, wherein the one or more signals from the computing device include location data associated with the physical location and associated with at least a threshold duration of visit to the physical location.

5. The method of claim 2, wherein the one or more signals from the computing device include location data associated with the physical location and wherein determining the output features of the training example is further based on determining that the location data is an outlier relative to other location data of the user.

6. The method of claim 2, wherein the one or more signals from the computing device include explicit user input via the computing device, the explicit user input indicating the user visited the physical location.

7. The method of claim 1, wherein the one or more associations of a given additional information item of the information items of the set to the physical location includes at least one of: temporal proximity of the given additional information item to the physical location, one or more entities associated with both the given additional information item and the physical location, and one or more terms included in the given additional information item and associated with the physical location.

8. The method of claim 1, wherein a given additional information item of the information items of the set is a document interacted with by the user, and wherein determining the one or more associations of the given additional information item to the physical location includes analyzing the document to determine the one or more associations of the document to the physical location.

9. The method of claim 8, wherein determining the one or more associations of the given additional information item to the physical location includes:
  providing a query to a computing device of the user based on determining the one or more associations of the document to the physical location, the query seeking confirmation the user visited the one or more physical locations;
  receiving affirmative input responsive to the query; and
  determining the one or more associations of the given additional information item of the information items to the physical location based on receiving the affirmative input.

10. The method of claim 8, wherein analyzing the document includes applying one or more rules to determine the one or more associations of the document to the physical location.

11. The method of claim 8, wherein analyzing the document includes using the machine learning system to determine the one or more associations of the document to the physical location.

12. The method of claim 1, wherein the information items of the set include a first information item from a first source and a second information item from a second source.

13. The method of claim 1, further comprising:
  determining additional input features of an additional set of one or more additional information items associated with an additional user;
  providing the additional input features to the machine learning system;
  receiving, as output from the machine learning system, one or more responsive output features; and
  determining one or more suggestions related to one or more responsive physical locations based on the responsive output features.

14. The method of claim 13, further comprising:
  providing the one or more suggestions to a computing device of the additional user.

15. The method of claim 13, wherein the providing the one or more suggestions to the computing device of the additional user is unrelated to providing results in response to a search query submission by the user.

16. A system including memory and one or more processors operable to execute instructions stored in the memory, comprising instructions to:
  determine that a user has visited a geographic area;
  based on determining that the user has visited the geographic area, determine output features of a training example based on the geographic area, the output features including a unique identifier of the geographic area;
  determine a set of information items associated with the user for use in determining input features of the training example, wherein determining the set of the information items is based on determining, for each of the information items of the set, one or more associations of the information item to the geographic area,
    wherein the information items are each indicative of one or more activities of the user via one or more computing devices of the user,
    wherein the information items include one or more non-location data based information items, and
    wherein the instructions to determine the one or more associations of a non-location data based information item, of the non-location data based information items, to the geographic area comprises instructions to:
      determine a creation time of the non-location data based information item is within a temporal threshold of a the visit of the user to the geographic area, and
      determine the non-location data based information item includes a term describing the geographic area;
  determine the input features of the training example based on the set of the information items associated with the user, the input features including an additional term of the non-location data based information item, the additional term being in addition to the term describing the physical location; and provide the training example to a machine learning system for training of the machine learning system based on the training example.

17. The method of claim 1, wherein the one or more associations of a given additional information item of the information items of the set to the physical location includes temporal proximity of the given additional information item to the one or more physical locations.

18. The method of claim 1, wherein the one or more associations of a given additional information item of the information items of the set to the physical location includes one or more entities associated with both the given additional information item and the one or more physical locations.

19. The method of claim 1, wherein the one or more associations of a given additional information item of the information items of the set to the physical location includes one or more terms included in the given additional information item and associated with the one or more physical locations.

20. The method of claim 1, wherein the one or more associations of a given additional information item of the information items of the set to the physical location includes both: temporal proximity of the given information item to the one or more physical locations, and one or more entities associated with both the given information item and the one or more physical locations.

21. The method of claim 1, wherein the physical location is a particular restaurant, a particular store, or a particular park.

22. The system of claim 16, wherein the geographic area is a city, a state, or a country.

* * * * *